(12) United States Patent
Bringer

(10) Patent No.: US 10,530,583 B2
(45) Date of Patent: Jan. 7, 2020

(54) METHOD FOR PUTTING A FIRST DEVICE IN SECURE COMMUNICATION WITH A SECOND DEVICE

(71) Applicant: Safran Identity & Security, Issy-les-Moulineaux (FR)

(72) Inventor: Julien Bringer, Issy-les-Moulineaux (FR)

(73) Assignee: IDEMIA IDENTITY & SECURITY FRANCE, Issy les Moulineaux (FR)

(*) Notice: Subject to any disclaimer, the term of this patent is extended or adjusted under 35 U.S.C. 154(b) by 112 days.

(21) Appl. No.: 15/649,554

(22) Filed: Jul. 13, 2017

(65) Prior Publication Data
US 2018/0019874 A1 Jan. 18, 2018

(30) Foreign Application Priority Data
Jul. 13, 2016 (FR) ...................................... 16 56778

(51) Int. Cl.
*H04L 9/32* (2006.01)
*H04L 9/08* (2006.01)
*H04L 29/06* (2006.01)

(52) U.S. Cl.
CPC .......... *H04L 9/3228* (2013.01); *H04L 9/0861* (2013.01); *H04L 9/321* (2013.01); *H04L 63/0428* (2013.01); *H04L 63/123* (2013.01)

(58) Field of Classification Search
CPC ... H04L 9/3228; H04L 9/0841; H04L 9/0861; H04L 9/321; H04L 9/3226;
(Continued)

(56) References Cited

U.S. PATENT DOCUMENTS

| | | | | |
|---|---|---|---|---|
| 5,953,420 A | * | 9/1999 | Matyas, Jr. | ........... H04L 9/0844 |
| | | | | 380/285 |
| 7,020,773 B1 | * | 3/2006 | Otway | ................ H04L 63/0869 |
| | | | | 380/278 |

(Continued)

FOREIGN PATENT DOCUMENTS

FR           2888691 A1     1/2007

OTHER PUBLICATIONS

Technical Guideline TR-03110-1: Advanced Security Mechanisms forMachine Readable Travel Documents and eIDAS Token—Part 1—eMRTDs with BAC/PACEv2 and EACv1 (Year: 2015).*

(Continued)

*Primary Examiner* — Dant B Shaifer Harriman
*Assistant Examiner* — Mahabub S Ahmed
(74) *Attorney, Agent, or Firm* — Womble Bond Dickinson (US) LLP

(57) ABSTRACT

A method for putting a first device in secure communication with a second device. The first device generating at least one first datum dependent on a private key specific to the first device and a public key specific to the second device. The second device generating at least one second datum dependent on a private key specific to the second device associated with the second device public key, and dependent on a third datum dependent on a public datum specific to the first device. Implementing a test verifying whether the first and second data meet a predetermined condition, and putting the first device in secure communication with the second device only if the predetermined condition is met. Before generating the second datum generating the third datum so that the predetermined condition is met only if input data are identical to reference secret data associated with the second device.

14 Claims, 7 Drawing Sheets

(58) Field of Classification Search
CPC ............ H04L 63/0428; H04L 63/0853; H04L 63/123; H04L 2209/046; G06F 21/34
USPC ......................................................... 713/168
See application file for complete search history.

(56) References Cited

U.S. PATENT DOCUMENTS

| | | | | |
|---|---|---|---|---|
| 7,551,619 | B2* | 6/2009 | Tiwari | H04L 12/4641 370/392 |
| 9,942,222 | B1* | 4/2018 | Fenton | H04L 63/0853 |
| 2005/0069137 | A1* | 3/2005 | Landrock | G06Q 20/341 380/278 |
| 2005/0144449 | A1* | 6/2005 | Voice | G06F 21/34 713/169 |
| 2005/0160264 | A1* | 7/2005 | Kuhn | H04L 63/045 713/168 |
| 2006/0225126 | A1* | 10/2006 | Brown | H04L 63/062 726/2 |
| 2007/0136573 | A1* | 6/2007 | Steinberg | G06F 21/32 713/155 |
| 2008/0034216 | A1* | 2/2008 | Law | H04L 9/3273 713/183 |
| 2009/0288143 | A1* | 11/2009 | Stebila | G06F 21/445 726/3 |
| 2010/0106970 | A1* | 4/2010 | Brown | G11C 7/24 713/168 |
| 2010/0306107 | A1* | 12/2010 | Nahari | G06Q 20/02 705/44 |
| 2010/0319058 | A1* | 12/2010 | Chen | H04L 9/3228 726/6 |
| 2012/0189125 | A1* | 7/2012 | Eichholz | G06Q 20/32 380/270 |
| 2013/0159195 | A1* | 6/2013 | Kirillin | G06Q 20/322 705/71 |
| 2013/0225081 | A1* | 8/2013 | Doss | H04W 4/21 455/41.2 |
| 2013/0268444 | A1* | 10/2013 | Namgoong | G06Q 20/40145 705/71 |
| 2015/0067328 | A1* | 3/2015 | Yin | H04L 9/3236 713/168 |
| 2015/0088778 | A1* | 3/2015 | Tsao | G06Q 50/265 705/325 |
| 2015/0312233 | A1* | 10/2015 | Graham, III | H04L 9/006 713/171 |
| 2016/0125416 | A1* | 5/2016 | Spencer | G06Q 20/1085 705/71 |
| 2016/0189136 | A1* | 6/2016 | Mercille | G06Q 20/3227 705/44 |
| 2016/0242030 | A1* | 8/2016 | Pang | H04L 9/002 |
| 2016/0269176 | A1* | 9/2016 | Pang | H04L 9/0841 |
| 2017/0033931 | A1* | 2/2017 | Fries | H04L 63/0281 |
| 2017/0201380 | A1* | 7/2017 | Schaap | G06F 8/654 |
| 2017/0289110 | A1* | 10/2017 | Matsuo | G06F 3/1285 |
| 2019/0068560 | A1* | 2/2019 | Roth | H04L 9/3247 |

OTHER PUBLICATIONS

Technical Guideline TR-03110-1: Advanced Security Mechanisms for Machine Readable Travel Documents and eIDAS Token—Part 1—eMRTDs with BAC/PACEv2 and EACv1; source: www.google.com (Year: 2015).*
Preliminary Research Report received for French Application No. 1656778, dated Mar. 24, 2017, 3 pages (1 page of French Translation Cover Sheet and 2 page of original document).
European Search Report and Written Opinion received for EP Patent Application No. 17181309.0, dated Aug. 14, 2017, 7 pages of Original Document Only.

* cited by examiner

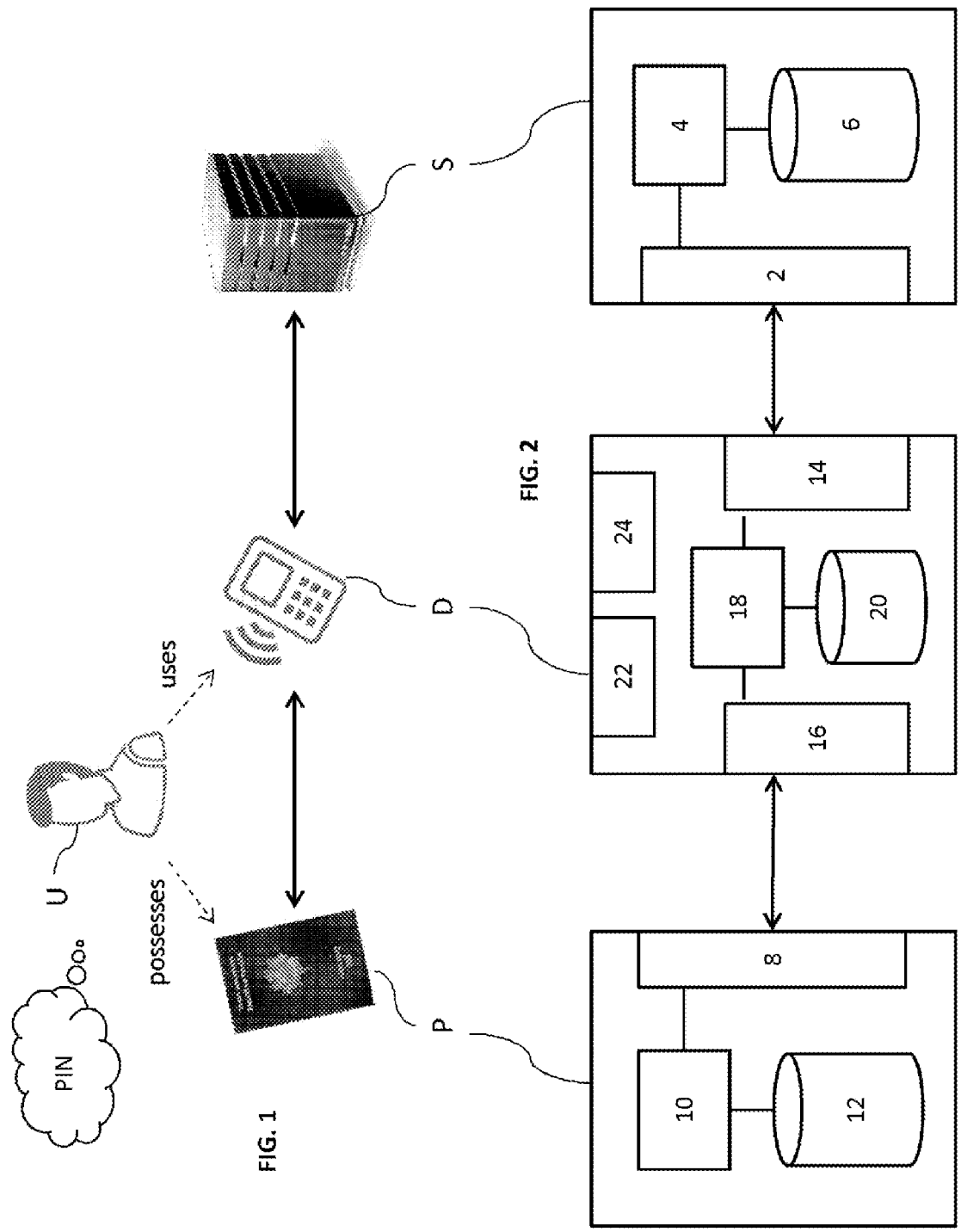

METHOD FOR PUTTING A FIRST DEVICE IN SECURE COMMUNICATION WITH A SECOND DEVICE

FIELD OF THE INVENTION

The present invention is directed towards a method for putting a first device such as an electronic passport in communication with a second device.

STATE OF THE ART

An electronic passport is a device memorising confidential data; it is specific to a user and able to be used for authentication of this user by a third entity.

The authentication of a user, holder of an electronic passport, generally has recourse to another device put in communication with the electronic passport.

For example, specification TR-03110-1 is known having the title "Advanced Security Mechanisms for Machine Readable Travel Documents and eIDAS Token", the protocol "Chip Authentication" comprising a method for putting in secure communication a first device known as a "terminal" with a second device called "MRTD chip" which may be an electronic passport.

The terminal stores a private key and a public key associated with one another. The MRTD chip also stores a private key and a public key associated with one another. The following steps are performed to put the terminal and MRTD chip in secure communication.

The method to put the terminal in communication with the MRTD chip comprises the following steps:
  the terminal generates a first key (agreement key) from the private key of the terminal and the public key of the MRTD chip;
  the MRTD chip generates a second key KA (agreement key) from the private key of the MRTD chip and the public key of the terminal;
  both devices jointly set a test in operation to verify whether the first and second generated keys are identical; the two devices are only put in secure communication if the two generated keys are identical (the two keys thereby forming a secret shared between the two devices under consideration).

However, this method has a major drawback: the security thereof is based entirely on the holding of the first device (the MRTD chip) by its legitimate holder. As a result, the two devices could be put in secure communication unduly if the first device has been stolen and is in ill-intentioned hands.

A method is also known from document US 2005/0069137 for mutual authentication between a client and a server, this method being based on the use of a memory authentication factor in the form of a One-Time Password (OTP). The disadvantage of this method is that its security is entirely based on prior knowledge of this One-Time Password. An attacker having discovered this password, by following the steps of the method described in this document, may masquerade as the client with the server, or masquerade as the server with the client.

SUMMARY OF THE INVENTION

It is one objective of the invention to propose a method to set up a communication channel between two devices in a more secure manner than with the solutions in the prior art.

In a first aspect of the invention, a method is therefore proposed for putting a first device in secure communication with a second device, the method comprising steps of:
  generating, by the first device, at least one first datum dependent on a private key specific to the first device and dependent on a public key specific to the second device;
  generating, by the second device, at least one second datum dependent on a private key specific to the second device associated with the public key specific to the second device, and dependent on a third datum, the third datum being dependent on a public datum specific to the first device;
  implementing a test verifying whether the first and second data meet a predetermined condition, and putting the first device in secure communication with the second device only if the predetermined condition is met.

The method, before the generation of the second datum, also comprises the step of:
  generating the third datum, the third datum taking on a value adapted so that the predetermined condition is met only if input data and reference secret data associated with the second device are identical.

The generation of the first and second data by the first and second devices under consideration, and the implementing of the test verifying whether the first and second data meet a predetermined condition, provide a first security level since the putting in secure communication of the first and second devices is subject to heed of this predetermined condition.

In particular it is to be noted that the private keys, specific to each of the two devices under consideration, take part in the generation of the first and second data that are subject of the test determining the setting up of a secure communication between the two devices. To obtain verification of the test condition so as to trigger this setting in communication, an attacker would have to discover not only the private key of the first device, but also the private key of the second device which would be arduous since by definition a private key of a device is never communicated to a third person. The fact that the first and second data depend on the respective private keys of the devices under consideration, therefore makes this first security level particularly robust.

In addition, if the entered input data are not identical to the specific secret data associated with the first device, then the third key takes on a value such that the predetermined condition is not met, as a result of which the first and second devices are not put in secure communication. On the contrary, the acquired input data must be identical to the secret data for such putting in communication to take put. The generation step of the third datum therefore has the effect of providing a second level of security adding to the first security level.

Also, since the reference secret data are associated with the first device, the putting in secure communication can only take put if the input data entered are indeed those which correspond to this first device.

Additionally, the third datum (used by the second device) is dependent on the public key of the first device, and the second datum (generated by the second device) is dependent on the third datum. In this manner, the two levels of security offered by the proposed method are time-interleaved. This synergic time-interleaving imparts the proposed method with a general level of security that is largely higher than that imparted by a method with two independent levels of security implemented in sequence.

The method in the first aspect of the invention can be completed by the following characteristics taken alone or in combination whenever technically possible.

The generation of third datum can be performed by a third device differing from the first and second devices. This is of advantage since the method can be implemented without modifying the second device: the latter merely needs to make conventional use of the third datum that it receives from the third device.

The input data can be acquired by the third device. In this manner, there is no need to add a input data acquisition interface to the first device; it is sufficient to use a third device already comprising said acquisition interface e.g. a smartphone. Ultimately, the use of the third device allows the method to be deployed more easily than in existing systems.

The acquisition of input data can be implemented in response to receiving of the public datum specific to the first device.

The public key specific to the second device can be transmitted to the first device via the third device.

The third datum can depend both on the input data and on the reference secret data associated with the first device. More specifically, the third datum can depend on:
  a verifier of the reference secret data obtained by a calculation comprising the application of a function, e.g. one-way function, to the reference secret data; and
  the image of the input data via application of the function.

The third datum may depend on a masked key, the masked key being generated by the first device and dependent on:
  the reference secret data associated with the second device; and
  the private key specific to the first device and/or the public key specific to the first device.

The masked key maskedPK may result from the following calculation:

$$maskedPK = PKpcd^v$$

where $v = f(PIN)$, $v$ being a verifier of the reference secret data and $f$ being a function e.g. a one-way function.

Alternatively, the masked key maskedPK may result from the following calculation:

$$maskedPK = v^{SKpcd}$$

where $v = g^{f(PIN)}$, $v$ being a verifier of the reference secret data, $f$ is a function e.g. a one-way function and $g$ is a predetermined datum of a finite group.

The third datum results from the following calculation:

$$PK' = maskedPK^{\left(\frac{1}{f(PIN')}\right)}$$

where $f$ is a function e.g. a one-way function.

The third datum is dependent on the input data but is not dependent on the reference secret data associated with the second device; and wherein the first datum is dependent on the reference secret data associated with the second device.

The third datum may also depend on the image of the input data through application of a function e.g. a one-way function, and the generation of the first datum generated by the first device may then use a verifier of the reference secret data obtained by a calculation comprising the application of the function to the reference secret data.

The third datum may result from the following calculation:

$$PK' = PKpcd^{f(PIN')}$$

where $f$ is the function.

Said function may depend on a random salt shared by the first device and the third device, and/or on a random seed selectively stored by a third device different from the first and second devices.

The method may further comprise steps of:
  searching in a database for a verifier of reference secret data, associated with the public key of the second device,
  if no verifier is found during the search, interruption of the method so that the generation of the third datum is not implemented.

The method may also comprise updating of the verifier before implementation of the method for subsequent putting in communication.

The first datum generated by the first device may result from the following calculation:

$$K = PKpicc^{SKpcd}$$

The second datum generated by the second device may result from the following calculation:

$$K' = PK'^{SKpicc}$$

The first device may also transmit a challenge to the second device, and the second datum generated by the second device may comprise: a proof datum calculated from the private key of the second device and from the challenge, and a datum calculated from the third datum. The first datum generated by the first device is then dependent on the challenge datum.

The test verifying whether the first and second data meet a predetermined condition may comprise sub-steps of:
  transmission of the at least one second datum to the first device,
  verification, by the first device, whether the values of the first datum and second datum are the solution of a predetermined equation, the predetermined condition being met only if verification is positive.

The predetermined condition can be met only if the first and second data generated by the first device and by the second device respectively are identical.

The test verifying whether the first and second data meet a predetermined condition may further comprise:
  encryption, by one of the first and second devices, of a message using, among the first and second data, the datum that was generated by this device,
  transmission of the encrypted message to the other of the first and second devices,
  attempted decryption, by the other of the first and second devices, of the encrypted message using, among the first and second data, the datum that was generated by this other device, putting in communication only being allowed if decryption of the message is successful.

The second device may be a material authentication token such as a digital passport, digital identity card or bank card.

The putting in communication of the first and second devices may comprise the setting up of a secure communication channel between the first device and the second device.

The private key specific to the first device and/or the public key specific to the first device may be one-time keys used for only one communication.

The input data may be a password acquired by a data entry interface, or may represent a biometric.

In a second aspect of the invention, there is also proposed a computer program product comprising program code instructions to execute the steps of a method for putting a first device in secure communication with a second device, when this program is executed by at least one processor, wherein the first device is configured to generate at least one first datum dependent on a public key specific to the second device and dependent on a private key specific to the first device, the method comprising the steps of:
  transmitting to the second device a third datum for the generation by the second device of at least one second datum dependent on the transmitted third datum, and dependent on a private key specific to the second device associated with the public key specific to the second device, the third datum being dependent on a public key specific to the first device, so that a test verifying whether the first and second data meet a predetermined condition can be implemented, and the first and second devices only being put in secure communication if the condition is met;
  generating the third datum, the third datum taking on a value adapted so that the predetermined condition is met only if input data are identical to reference secret data associated with the second device.

In a third aspect of the invention, there is also proposed a computer program product comprising program code instructions for execution of the steps of a method for putting a first device in secure communication with a second device, when this program is executed by at least one processor, the method comprising steps of:
  generating at least one first datum dependent on a private key specific to the first device and dependent on a received public key;
  transmitting a public key specific to the first device, associated with the private key specific to the first device, for the generation by the second device of at least one second datum which is dependent on:
    a private key specific to the second device, associated with the public key specific to the second device; and
    a third datum, the third being dependent on the transmitted public key;
  participating in a test verifying whether the first and second data meet a predetermined condition, and putting in secure communication with the second device only if the predetermined condition is met,
wherein the first datum has a value adapted so that the predetermined condition is met only if reference secret data associated with the second device are identical to input data.

In a fourth aspect of the invention forming an alternative solution to the third aspect of the invention to solve the problem raised, there is also proposed a computer program product comprising program code instructions to execute the steps of a method for putting a first device in secure communication with a second device, when this program is executed by at least one processor, the method comprising steps of:
  generating at least one first datum dependent on a private key specific to the first device, and from a public key specific to the second device,
  generating a masked key, the masked key being dependent on the private key specific to the first device and/or on a public key specific to the first device and associated with the private key specific to the first device,
  transmitting the masked key for the generation by the second device of at least one second datum dependent on:
    a private key specific to the second device and associated with the public key specific to the second device; and
    a third datum, the third datum being dependent on the transmitted masked key;
  participating in a test verifying whether the first and second data meet a predetermined condition, and putting in secure communication with the second device only if the predetermined condition is met,
wherein the masked key has a value adapted so that the predetermined condition is met only if the reference secret data associated with the second device are identical to input data.

In a fifth aspect of the invention, there is also proposed a device for putting a first device in secure communication with a second device, wherein the first device is configured to generate at least one first datum on a public key specific to the second device and dependent on a private key specific to the first device, the device comprising:
  a communication interface configured to transmit a third datum to the second device for the generation by the second device of at least one second datum dependent on the transmitted third datum and dependent on a private key specific to the second device associated with the public key specific to the second device, the third datum being dependent on a public key specific to the first device associated with the private key specific to the first device, so that a test verifying whether the first and second data meet a predetermined condition is implemented, and the first and second devices only being put in secure communication if the condition is met;
  at least one processor configured to generate the third datum, the third datum taking on a value adapted so that the predetermined condition is met only if input data are identical to reference secret data associated with the second device.

In a sixth aspect of the invention there is also proposed a device intended to be put in secure communication with a second device, the device comprising:
  a communication interface configured:
    to transmit a public key specific to the device for the generation, by the second device, of at least one second datum dependent on a private key specific to the second device and dependent on a third datum, the third datum being dependent on the transmitted public key;
  at least one processor configured:
    to generate at least one first datum, wherein the first datum is dependent on a private key specific to the device associated with the public key specific to the device, and is dependent on a public key specific to the second device associated with the public key specific to the second device,
    to participate in a test verifying whether the first and second data meet a predetermined condition, and to take part in the putting in secure communication with the second device only if the predetermined condition is met,
wherein the first datum has a value adapted so that the predetermined condition is met only if reference secret data associated with the second device are identical to input data.

In a seventh aspect of the invention forming an alternative to the sixth aspect of the invention to solve the problem raised, there is also proposed a device intended to be put in secure communication with a second device, the device comprising:

a communication interface,
at least one processor configured:
  to generate at least one first datum dependent on a private key specific to the first device and from a public key specific to the second device,
  to generate a masked key, the masked key being dependent on the private key specific to the device and/or on a public key specific to the first device associated with the private key specific to the first device,
  to order transmission of the masked key by the communication interface, for the generation by the second device of at least one second datum dependent on:
    a private key specific to the second device associated with the public key specific to the second device; and
    a third datum, the third datum being dependent on the transmitted masked key,
  to participate in a test verifying whether the first and second data meet a predetermined condition, and putting in secure communication with the second device only if the predetermined condition is met,
wherein the transmitted masked key has a value adapted so that the predetermined condition is met only if the reference secret data associated with the second device are identical to input data.

DESCRIPTION OF THE FIGURES

Other characteristics, objectives and advantages of the invention will become apparent from the following description that is solely illustrative and nonlimiting, and is to be read in connection with the appended drawings in which:

FIGS. 1 and 2 schematically illustrate an authentication system according to one embodiment of the invention.

In all the Figures, similar elements carry the same references.

DETAILED DESCRIPTION OF THE INVENTION

Figure 3:
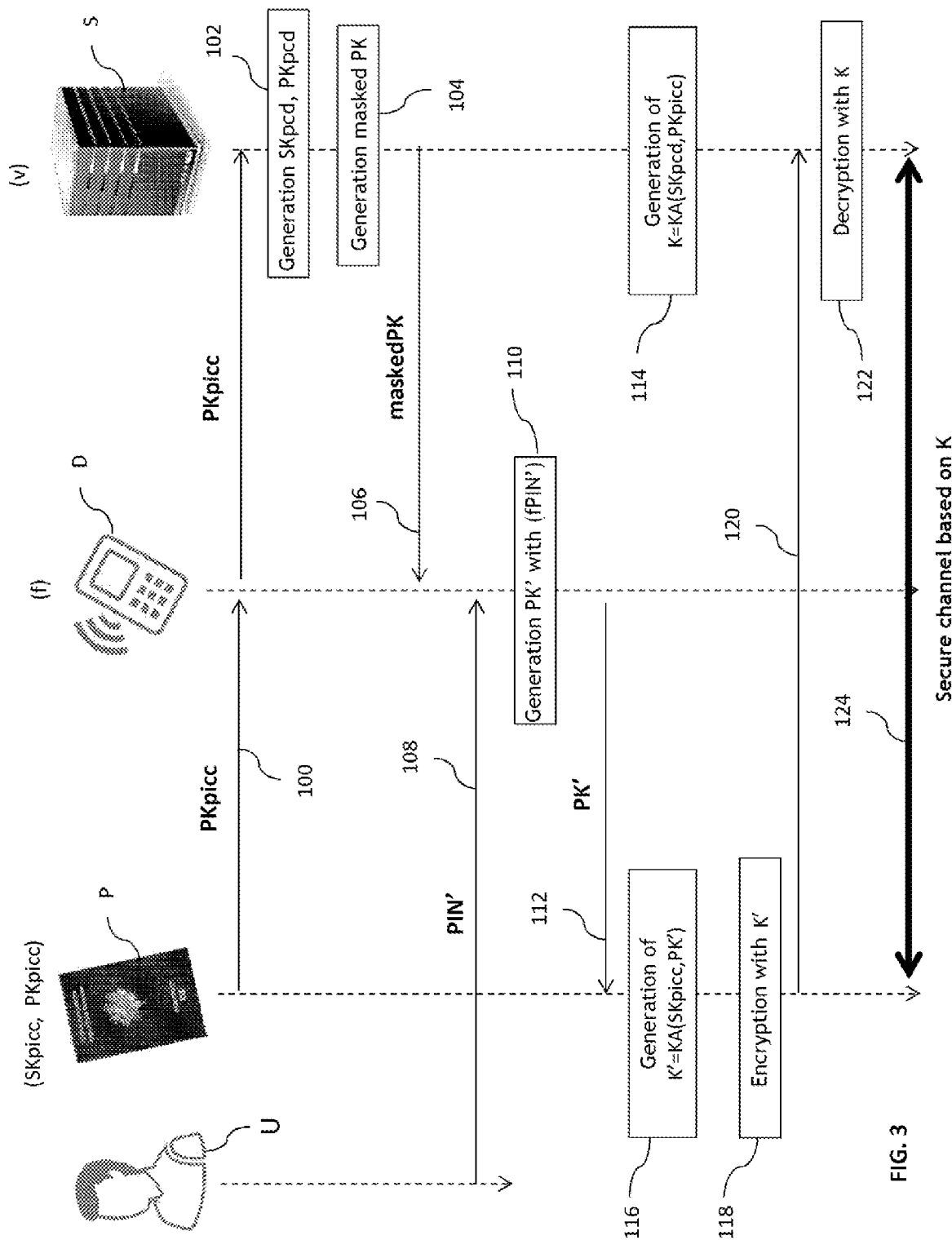
FIGS. 3 to 8 are diagrams illustrating six different embodiments of a method for putting a first device in communication with a second device.

With reference to FIGS. 1 and 2, an authentication system comprises three devices: a first device S, a second device P and a third device D.

The first device S comprises a communication interface 2, at least one processor 4, and a memory 6.

The communication interface 2 is configured to communicate with the third device D. For example, this interface is of wireless type (Wi-Fi, Bluetooth, NFC, 3G/4G cell network, etc.) or wire type (Ethernet, etc.).

The processor 4 is configured to execute the computing of data stored by memory 6 or received via the communication interface 2.

The memory 6 is configured to store data organised in a database. For example, the memory 6 comprises a persistent memory unit comprising at least one of the following elements: hard disk, SSD disk, flash memory, etc. The memory also comprises a temporary memory unit (RAM) the content of which is deleted when powered off.

The first device S is a server for example. The server ensures a restricted access service requiring prior authentication.

The second device P comprises a communication interface 8, at least one processor 10 and a memory 12, able to have the same characteristics as the corresponding components of the first device S.

Stored in the memory 12 is a private key SKpicc specific to the second device P. This private key SKpicc is designed to remain secret, therefore never to be communicated outside the second device P.

Also stored in the memory is a public key PKpicc associated with the private key SKpicc. This public key, as its name indicates, can be communicated by the second device P to another device.

For example, the second device P is (or is included in) a material authentication token specific to a user U: an electronic passport, an electronic identity card, a bank card, etc. The second device P may then be in the form of a portable electronic chip.

Both keys SKpicc and PKpicc are determined for example during a pre-configuration step, before or at the time of the first use of the second device P by its rightful owner.

The two keys SKpicc and PKpicc of the second device P are linked by the following equation (allowing computing the public key from the private key):

$$PKpicc = g^{SKpicc}$$

where g is a predetermined element of a finite group, the law of which here is denoted multiplicatively, previously stored in the memory 6 of the first device S. The group under consideration may be a group of integers or else a group of points on an elliptical curve.

The third device D comprises at least one communication interface 14, 16, at least one processor 18 and a memory 20.

The communication interface 14, 16 is configured to communicate with the first and second devices S, P. As a variant, two different communication interfaces 14 and 16 are provided to communicate with the first device S and second device P respectively. In this case, the two communication interfaces 14 and 16 may be of different type corresponding to the different respective types of the communication interfaces 2 and 8.

The processor 18 and the memory 20 may be similar to those of devices S and/or P.

The third device D may also comprise a display screen 22.

The third device also comprises an acquisition interface 24 of input data.

The acquisition interface 24 may therefore comprise a data entry interface e.g. a touch screen or keypad, and/or may comprise a biometric sensor.

The acquisition interface may also comprise a camera.

The third device D is a mobile terminal for example, such as a smartphone.

The third device D does not need to be highly secure.

Method for Putting the First Device in Secure Communication with the Second Device Several embodiments of a method for putting the first device S in secure communication with the second device P are described below in connection with FIGS. 3 to 7.

In the remainder hereof, the calculations performed by the devices S, P, D are implicitly performed by the respective processors thereof 4, 10, 18 executing computer programs. In addition, the transmission of data from one of the three devices towards another of these three devices implicitly involves the associated communication interfaces 2, 8, 14 and/or 16.

A) Preliminary Enrolment Phase

At a preliminary enrolment phase, reference secret data PIN associated with the second device P are determined.

The reference secret data are assumed to be known only to the rightful owner U of the second device P.

For example, the secret data are acquired by the acquisition interface of the third device D, then transmitted to the first device S. For example, via the data entry interface the user enters a personal code (e.g. a "PIN" code having several characters) stored by the user, the secret data PIN then being this personal code. As a variant, the secret data in the form of a personal PIN code are determined by the first device S and communicated to the rightful owner U of the second device P by appropriate means assumed to be trustworthy.

The first device S generates a verifier v from the secret data PIN and from a predetermined function $f$. As a variant, the verifier v is generated by the third device D and transmitted by the third device D to the first device S.

The function $f$ is preferably a one-way function e.g. a hashing function.

The verifier v is the image of the secret data by the predetermined function, as expressed by the following equation:

$$v=f(PIN)$$

As a variant, the verifier is generated as follows:

$$v=g^{f(PIN)}$$

Preferably, the predetermined function $f$ is dependent on a random salt shared by the first device S and the third device D and/or a random seed selectively stored by the third device D.

The data image w by the predetermined function $f$ can then be written in one of the following manners:

$$f(w)=H(w,r)$$

$$f(w)=H(w,s)$$

$$f(w)=H(w,s,r)$$

where H is a predetermined function (preferably one-way, possibly hashing), s designates the salt and r designates the random seed. The use of the salt and/or seed allows an increase in the possible random values for the verifier v, making it even more difficult to determine the secret PIN data from the verifier.

The computed verifier v is stored in the memory of the first device S.

Additionally, the second device P transmits its public key PKpicc to the first device S via the third device D.

The public key PKpicc is also stored in the memory 6 of the first device S.

The memory 6 of the first device S contains a database comprising several elements, each element associating a public key with a verifier v of reference secret data PIN. In other words, each element concerns a person, owner of a second device P who is assumed to know the reference secret data PIN corresponding to the verifier v.

On the other hand, the reference secret data PIN are themselves preferably not stored in the memory 6 of the first device S, to make it more difficult for an ill-intentioned third party to determine the value of these reference secret data.

In particular, a one-way function such as a hashing function being most difficult to inverse, it is very difficult to infer the secret PIN data from the stored verifier v. As a result, even if an ill-intentioned third party managed to access the database, such person would be incapable of finding the reference secret data.

B) Exchange of First and Second Data by Devices S and P

It is assumed that, after enrolment, the first device S and second device P have for some reason to be put in communication.

With reference to FIG. 3, a first embodiment of a method for putting devices P and S in secure communication comprises the following steps.

A non-secure communication channel is set up between the first device S and second device P. This non-secure communication channel passes via the third device D which acts as intermediary between the first device S and second device P. Unless otherwise mentioned, in the remainder hereof all data transmitted from one device to another are transmitted over the non-secure channel.

The second device P transmits 100 its public key PKpicc to the first device via the third device D. The first device S verifies whether the public key PKpicc is indeed a key referenced in the database stored in the memory 6 of the first device S.

Alternatively, each element of the database also comprises an identifier specific to a user; the second device P transmits an own identifier to the first device S in lieu and stead of its public key PKpicc. The first device S then searches to determine whether a public key associated with the received identifier is referenced in the database.

If the key is not referenced therein, this means that the received key PKpicc was not sent by a valid device P (e.g. the device P is an expired electronic passport, or else a device seeking to pose as a valid electronic passport for hacking purposes). In this case, the processor 4 generates an error message and the method comes to an end.

If the key PKpicc is indeed referenced in the database, and in particular is associated with a verifier v of reference secret data produced at the preliminary enrolment phase (which is the case here), this means that the rightful owner of the second device P is known, and that such owner is assumed to have stored the reference secret data corresponding to the verifier v. In this case, the method is continued with the steps below.

The first device S generates an own private key SKpcd (step 102).

The first device S also generates during step 102 a public key PKpcd associated with the private key SKpcd. Similar to the public key PKpicc of the second device P, the public key PKpcd is for example the result of the following calculation:

$$PKpcd=g^{SKpcd}$$

The two keys SKpcd and PKpcd of the first device S are preferably one-time keys which will only be used a single time, for a single secure communication. In other words, when the first device S subsequently receives a public key from an approved device such as the device P, for a subsequent secure communication, new keys SKpcd and PKpcd will be generated 102 by the first device S.

The first device S generates (step 104) a masked key maskedPK from the public key PKpcd or from the private key SKpcd, and from the verifier v of the reference secret data.

If $v=f(PIN)$, the computing performed by the processor 4 of the first device S to calculate the masked key is the following:

$$maskedPK=PKpcd^v$$

If $v=g^{f(PIN)}$, the computing performed by the processor of the first device S to calculate the masked key is the following:

$$maskedPK=v^{SKpcd}$$

The first device S transmits (step 106) the masked key maskedPK to the third device D. Therefore, the public key PKpcd of the first device S is not transmitted to the third device D and therefore cannot be intercepted by eavesdropping communications between devices D and S.

Another advantage imparted by transmission of the masked key maskedPK instead of the public key PKpcd is that it provides protection against the takeover of the third device D by an ill-intentioned third party (e.g. the smartphone of the user U is stolen). If the third device D received the key PKpcd, it could then transmit the same as such to the second device P and hence, for the purpose of implementing the communication method, succeed in causing the first device S to believe that it has used the right reference secret data PIN (but without making use thereof since the masked key maskedPK has not been used).

In response to receiving of the masked key maskedPK, the third device D displays a message on its display screen prompting the user of the third device D to enter input data via the acquisition interface 24.

The acquisition interface 24 acquires 108 the input data PIN' input by the user. Evidently it is assumed that the rightful owner of the second device P enters the PIN value of the reference secret data associated with this second device P.

For example, via the data entry interface 24, the user enters input data in the form of a code of value PIN'. The third device D generates 110 a key PK' from the masked key maskedPK received from the from first device P and from the acquired input data PIN'.

The key PK' is calculated as follows for example from the third device D:

$$PK'=\text{maskedPK}^{(1/f(PIN'))}$$

The third device D transmits 112 the key PK' to the second device P.

C) Processing Operated on the Basis of Exchanged Data

The first device S generates at least a first datum from its private key SKpcd and from the public key PKpicc received from the second device P.

In addition, the second device P generates at least one second datum from its private key SKpicc and from key PK' which is dependent on the public key PKpcd of the first device S.

In the first embodiment such as illustrated in FIG. 3, the first datum is a first key K and the second datum is a second key K'.

The keys K and K' are Diffie-Hellman keys.

For example, the first device generates key K as follows (step 114):

$$K=\text{PKpicc}^{SKpcd}$$

The second device P generates key K' as follows (step 116):

$$K'=PK'^{SKpicc}$$

In the light of the preceding equations, this key K' is in fact equal to:

$$K'=g^{SKpicc*SKpcd*f(PIN)/f(PIN')}$$

In particular, if PIN=PIN' (i.e. if the input data are equal to the reference secret data), then:

$$K'=g^{SKpicc*SKpcd}=K$$

A test is then performed verifying whether the first and second keys meet a predetermined condition.

The first device S and the second device P take part in this test.

In the first embodiment, the predetermined condition is an identity condition between the two keys K et K' calculated by the first device S and the second device P. In other words, the predetermined condition is met only if the two generated keys K et K' prove to be identical, thereby forming a shared secret between the first device S and the second device P.

If the equations and calculations presented above are implemented, the two keys K and K' will be identical only if PIN=PIN'. Basically, the key PK' takes on a value that is adapted so that the predetermined condition is met only if the acquired input data PIN' are identical to the reference secret data PIN specific to the user.

The two keys K and K' are preferably not directly compared; this would in fact amount to transmitting one of the two keys via the non-secure channel which it is sought to avoid, so that the shared secret cannot be intercepted. Consequently, the test verifying whether the predetermined condition is met may comprise the following steps.

The second device P encrypts (step 118) a predetermined message (the sequence of characters "Hello World !" for example) directly or indirectly using the key K' generated by this second device P. For example, the second device P generates an encryption key Kenc from the key K' and encrypts the message with this encryption key Kenc.

The second device P transmits (step 120) the encrypted message to the first device S via the third device D.

The first device S then attempts to decrypt (step 122) the encrypted message directly or indirectly using the key K which it has generated. For example, the first device S generates a decryption key from the generated key K and decrypts the message using the decryption key.

If decryption is successfully carried out, the predetermined condition is met. Otherwise this predetermined condition is not met.

If the predetermined condition is met, then the first device S and the second device P are mutually put in secure communication. If the condition is not met devices S and P are not put in secure communication.

Therefore, so that device P and device S can be put in secure communication, two accumulated conditions must be fulfilled: not only must the second device P be recognized as being authentic by the first device S, but also input data corresponding to the second device P must be entered.

The putting in communication for example comprises setting up a secure communication channel between the first device S and the second device P (step 124). Otherwise the secure channel is not set up. The secure communication channel is set up by means of the shared secret K=K', following a known method.

The secure communication channel may pass via the third device D, in which case the setting up thereof comprises the setting up of a first secure sub-channel between the first device S and the third device D, and of a second secure sub-channel between the third device D and the second device P. The third device then acts as relay for data circulating in the established secure channel.

Throughout the proposed method for putting in communication devices P and S, the third device D does not have any knowledge of the most sensitive data such as the SKpicc key and the reference secret data PIN. This is the reason why the device D does not need to be highly secure.

It was seen above that the validity of the public key PKpicc was verified by the first device S, and that the method could come to an early end before the generation of the keys maskedPK or PK'. This provides protection against dictionary attacks using a device which attempts to masquerade as an approved device P transmitting a false key PKpicc to the first device S, intercepting the maskedPK key transmitted by the first device S or the PK' key transmitted by the third device D and endeavouring to infer the key K' therefrom. When the key PKpicc is not referenced in the database, these keys are not transmitted, making such attacks impossible via simple eavesdropping of communications between the devices S, P, D under consideration.

Before subsequent secure communication with another device, the verifier is preferably updated by the first device S.

For example, if v=f(PIN), provision can be made to update the verifier by iteration of the type:

$$v := f(v)$$

When the method is next implemented, $f := f(f(.))$ will be used. This updating provides additional protection against replay attacks.

Another possible update for the verifier v is the following:

$$v := H(v, time)$$

where time is a time value measured at a reference instant e.g. on starting implementation of the communication method (on receipt of the key PKpicc). This time value time may be dependent on a random value determined by the third device D and transmitted to the first device S.

Updating is particularly simple to implement on the fly when v=f(PIN).

The first embodiment described above (and its different variants) is advantageously compatible with the protocol "Chip Authentication" in its version 1 (CAv1) defined in specification TR-03110-1 titled "Advanced Security Mechanisms for Machine Readable Travel Documents and eIDAS Token", and with at least the subsequent versions 2 and 3 of this protocol (CAv2, CAv3).

In particular, all the processing operations performed by the second device P conform to protocol CAv1; in other words, the proposed method can be implemented by means of a second device P which implements this protocol CAv1, without the need for any modification of the internal operating thereof.

However, the first embodiment extends the "Chip Authentication" protocol by adding thereto an additional level of security (at least via steps 104 and 110 implemented by devices D and S and relating to the reference secret data PIN and to the input data PIN').

Once the secure communication channel is set up (called "secure channel" in specification TR-03110-1), passive authentication can be initiated.

Said passive authentication can be used for example to determine the access by a user to a service provided by the first device S. For example, authentication can be used to determine access by a user to a secure zone of a website hosted by the device S or a site hosted by a third party communicating with the device S.

Figure 4:
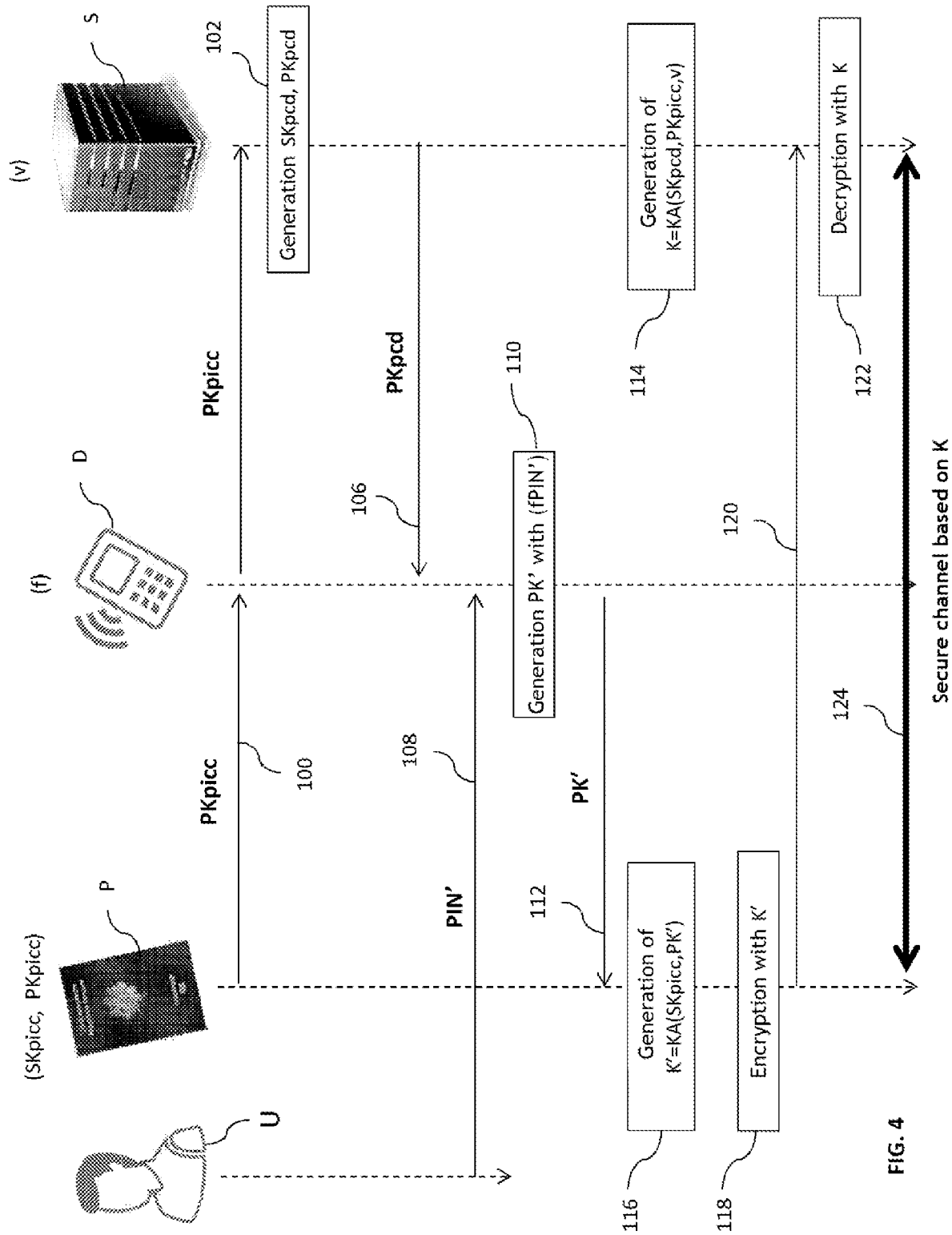

With reference to FIG. 4, a second embodiment of a method for putting devices P and S in secure communication differs from the first embodiment by the following features.

The first device S transmits its public key PKpcd to the third device, and it is on the basis of this public key PKpcd that the third device generates key PK' during step 110. No masked key is generated by the first device S.

The third device D can then perform the following calculation to generate key PK' during step 110 on the basis of acquired input data PIN' and the predetermined function $f$:

$$PK' = PKpcd^{f(PIN')}$$

Contrary to the first embodiment using a masked key, the key PK' is not dependent on reference secret data PIN. The computing performed at step 110 therefore differs from that of the variant of the first embodiment in FIG. 3 with a masked key.

The second device P calculates the key K' as follows:

$$K' = KA(Skpicc, PK') = PK'^{SKpicc}$$

Also, the first device S then calculates 114 key K as follows:

$$K = PKpicc^{(SKpcd \cdot f(PIN))}$$

Unlike the variant with the masked key, the first datum (key K) generated 114 by the first device S is dependent on reference secret data (more exactly on the verifier v=f(PIN)).

On developing the calculations assuming that v=f(PIN), this gives:

$$K = g^{SKpicc \cdot SKpcd \cdot f(PIN)}$$

$$K' = g^{SKpicc \cdot SKpcd \cdot f(PIN')}$$

As a result, as in the variant described previously using the masked key maskedPK, PIN=PIN' if and only if K=K'.

Therefore, the value of the key PK' thus calculated remains adapted so that the predetermined condition is met only if the acquired input data are identical to the reference secret data specific to the user.

The second embodiment without a masked key is simpler to implement than the first embodiment with the masked key, insofar as the first device S calculates one exponentiation less than in the first embodiment.

A further advantage of the second embodiment is that the exchange of data between the two devices S and P to be put in communication for the generation of the first datum K and of the second datum K' can be carried out before the verifier is calculated. This therefore offers better flexibility for implementation of the method.

Figure 5:
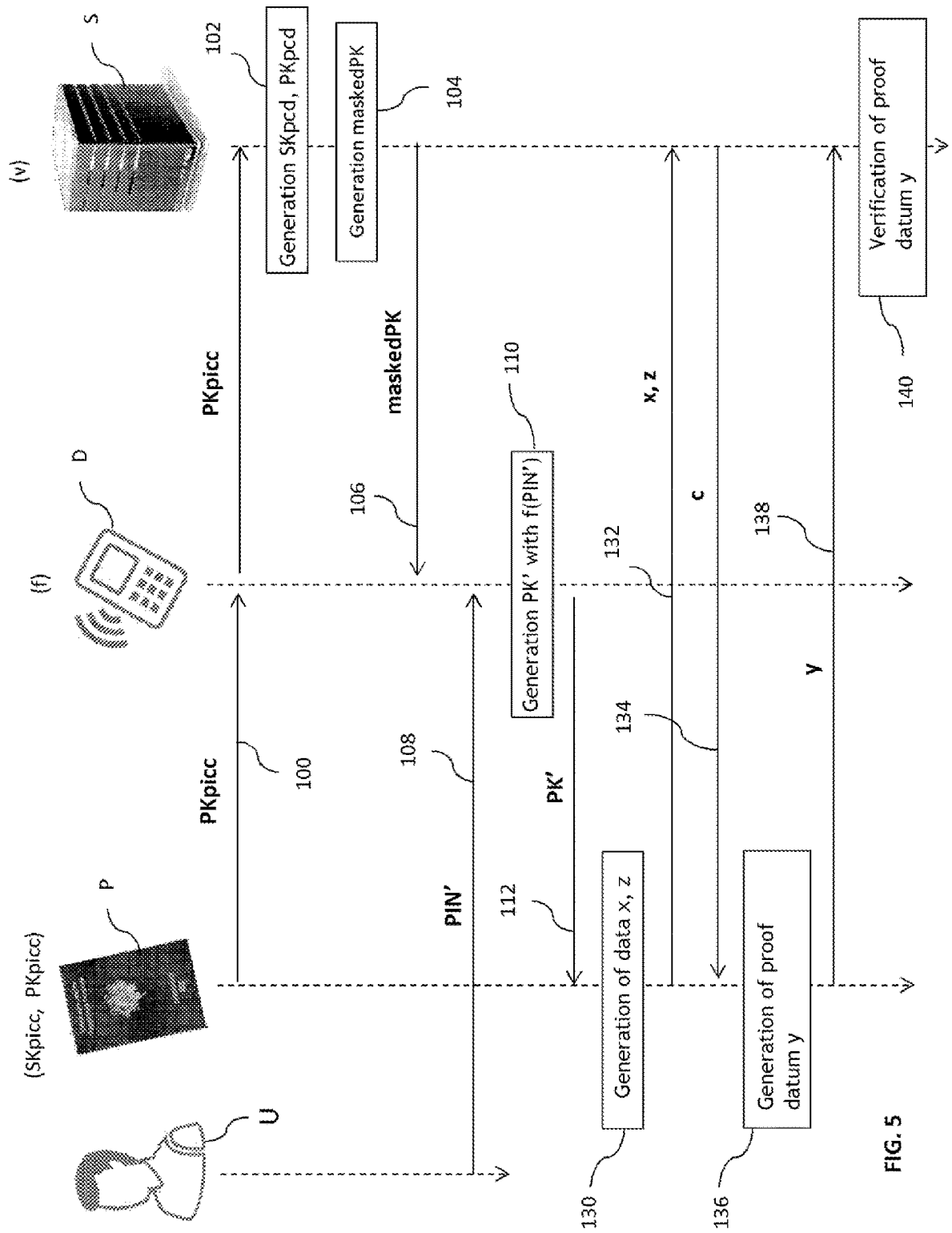

In a third embodiment illustrated in FIG. 5, the processing operations by the devices P and S on the basis of keys PK' and PKpicc differ from those of the first embodiment and second embodiment.

Enrolment (see section A above), the exchange of keys (see section B above) may be identical to those of the first embodiment.

A masked key maskedPK is calculated as in the first embodiment: this gives $$maskedPK = g^{f(PIN) \cdot SKpcd}$$

$$PK' = maskedPK^{(1/f(PIN'))}$$

In the third embodiment, the processing operated by the devices P and S on the basis of keys PK' and PKpicc are typical of a "Randomized Schnorr" identification scheme, described at: http://dl.acm.org/citation.cfm?id=1533086, and in the article "Cryptanalysis of EC-RAC, a RFID Identification Protocol", by Julien Bringer, Hervé Chabanne and Thomas Icart.

The second device P then calculates the following data (step 130):

$$g = g^{r1}$$

$$z = PK'^{(r2)}$$

where r1 and r2 are randomly selected.

The second device P transmits data x and z to the first device S via the third device D (step 132).

In addition, the first device S transmits a challenge c via the third device D (step 134). The challenge is generated for example by the first device S on receipt of the data x, z.

The second device P generates a proof datum y on the basis of the challenge c and its private key SKpicc (step 136), for example as follows:

$$y=r1+SKpicc*c+r2$$

The second device P transmits the proof datum y to the first device S via the third device D (step 138).

The first device verifies the proof datum y (step 140). For example, the first device S verifies 140 whether:

$$PKpcd^{y}*x^{(-SKpcd)}*z^{(-1)}=PKpicc^{(SKpcd*c)}$$

This equation is verified if and only if PIN=PIN'.

In the third embodiment, the first and second data respectively generated by the first and second devices S and P are not two keys here able to form a shared secret, but are composed of data z and y (second data) and the term $PKpicc^{(SKpcd*c)}$ (first datum). Also, the predetermined condition to be met is that the two terms of the above equation are equal.

The third key (PK') therefore again takes on a value adapted so that the predetermined condition is met only if the acquired input data (PIN') are identical to reference secret data (PIN) associated with the second device (P).

If this equality is verified, then the two devices S and P are put in secure communication.

Figure 6:
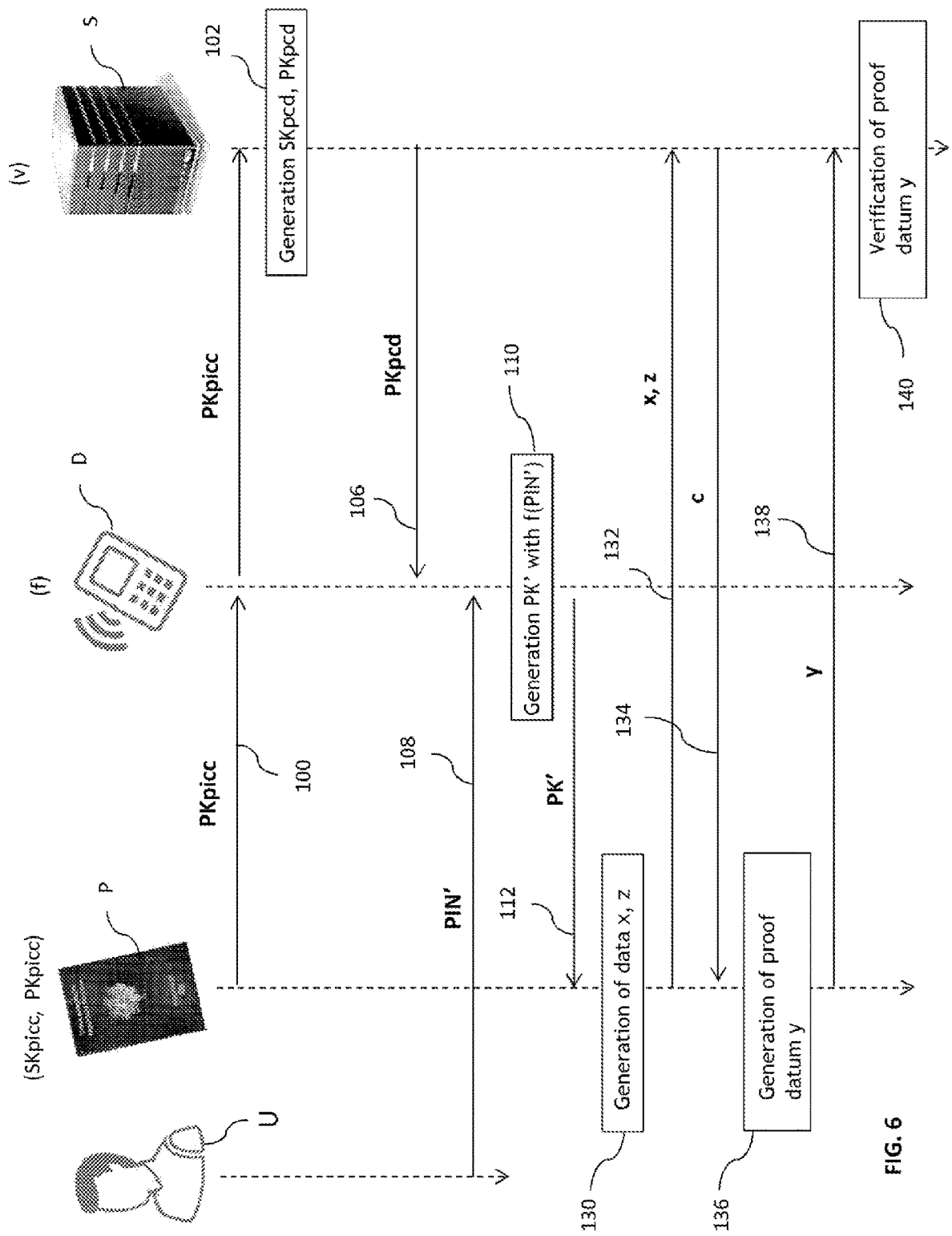

A fourth embodiment of the method for putting two devices S and P in secure communication is illustrated in FIG. 6.

This fourth embodiment differs from the third embodiment through the following characteristics.

No masked key is generated. As in the second embodiment, the first device S transmits its public key PKpcd to device D, and key PK' is calculated by the third device D in the following manner:

$$PK'=PKpcd^{f(PIN')}$$

Also, the first device S verifies 140 whether:

$$PKpcd^{y}*x^{(-SKpcd)}*z^{(-1/f(PIN))}=PKpicc^{(SKpcd*c)}$$

This equation can also be written as follows:

$$PKpcd^{y}*x^{(-SKpcd)}=z^{(1/f(PIN))}*PKpicc^{(SKpcd*c)}$$

The first datum is the right-side term in one of these two equivalent equations.

This equality is verified if and only if PIN=PIN'.

Contrary to the third embodiment, this equality involves the verifier of the reference secret data.

Figure 7:
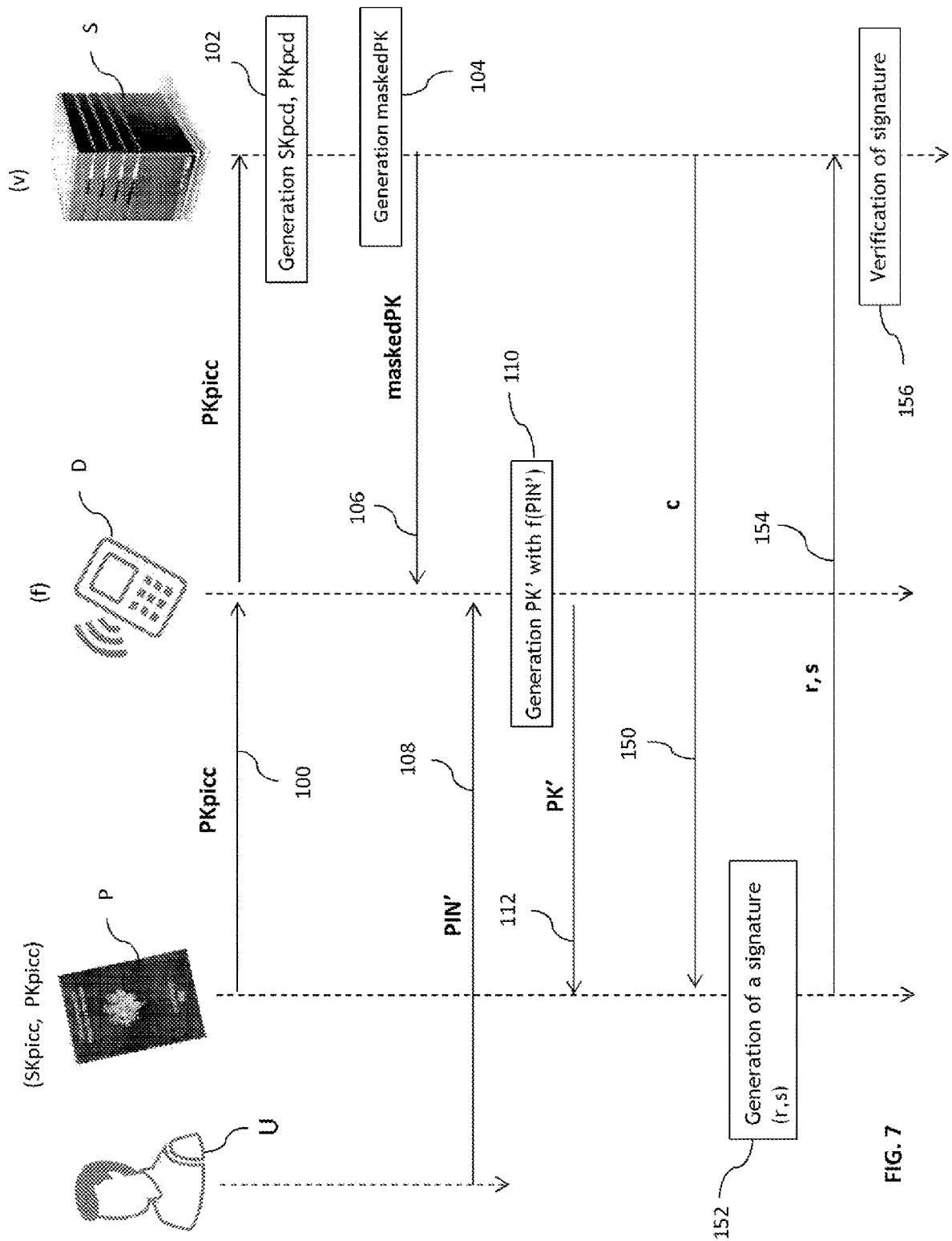

A fifth embodiment of the method for putting devices S and P in secure communication is illustrated in FIG. 7.

In this fifth embodiment, the processing operations by the devices P and S on the basis of keys PK' and PKpicc also differ from those of the preceding embodiments.

Enrolment (see section A above), the exchange of keys (see section B above) may be identical to those of the first embodiment.

In the fourth embodiment, the keys PK' and PKpicc are used to implement a digital signature algorithm.

In the remainder hereof, the nonlimiting example is taken of an ECDSA algorithm (Elliptic Curve Digital Signature Algorithm), in which:

$$PKpicc=SKpicc*g$$

$$PKpcd=SKpcd*g$$

where the element g is a point on an elliptic curve.

The masked key maskedPK and key PK' are generated 104, 110 using the same calculations as those set forth for the first embodiment. This gives:

$$maskedPK=g^{f(PIN)*SKpcd}$$

$$PK'=maskedPK^{(1/f(PIN'))}$$

The first device S transmits 150 a challenge c to the second device P via the third device D.

The second device P calculates 152 the following data:

$$(x,y)=k.PK'$$

$$r=x \bmod n$$

$$s=k^{(-1)}(H(c)+r*SKpicc) \bmod n$$

where (x,y) designates the coordinates of a point on an elliptic curve, k is a randomly selected scalar, H is a predetermined function (preferably one-way, possibly hashing) and n is a predetermined integer. It is to be noted that the data x, z, r, H and s do not only represent data of the same name described in the third embodiment.

The data pair (r,s) form a signature of the challenge c.

The second device P transmits the signature (r,s) to the first device S via the third device D (step 154).

The first device performs verification of the valid nature of this signature for the public key PKpicc in the group generated by PKpcd (step 156).

Verification 156 comprises the following calculations:

$$w=s^{(-1)} \bmod n$$

$$(x',y')=[w*H(c) \bmod n].PKpcd+[[w*r \bmod n]*SKpcd].PKpicc$$

This gives x'=r if and only if PIN=PIN'. The signature is valid in the presence of this equality.

Figure 8:
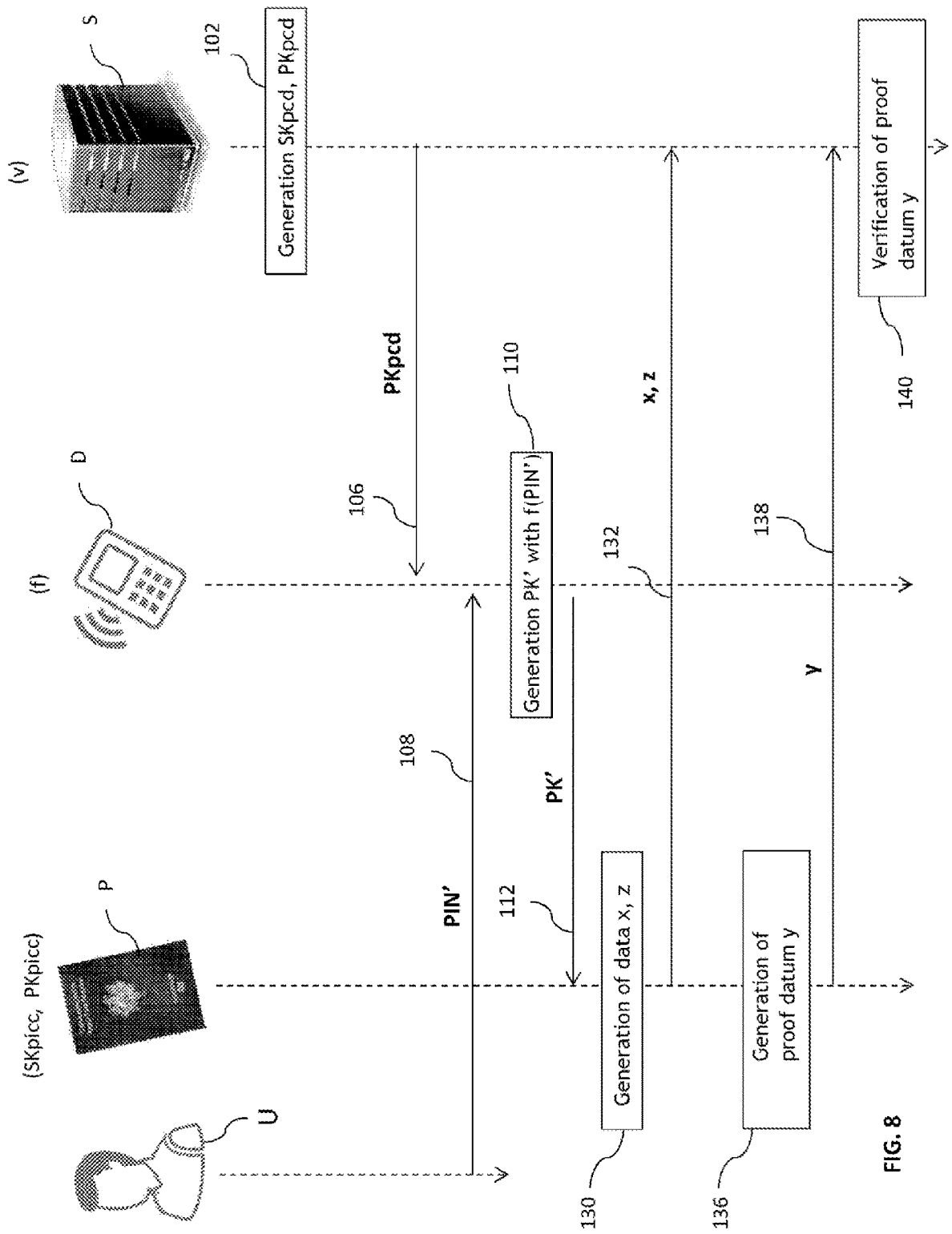

A sixth embodiment of the method for putting devices S and P in secure communication is illustrated in FIG. 8.

This sixth embodiment differs from the fourth embodiment through the fact that the public key PKpicc of the second device P is not transmitted to the first device S.

Also, the challenge c is not transmitted to the second device P. The device P has in fact already stored a plurality of challenges c.

The first device S stores a plurality of one-time keys each dependent on a challenge and on a public key PKpicc specific to a respective device such as device P.

To implement verification step 140, the first device S does not use the public key PKpicc, which is unknown to it, but uses one of the one-time keys which reputs the term $PKpicc^{c}$ in the two equalities described in connection with the fourth embodiment.

Other Embodiments

The invention can be the subject of other variants that are all applicable to the different embodiments described above.

In each of the previously described embodiments, the input data PIN are a code entered by a user of the third device D via a data entry interface 24 such as a keypad or touchscreen. Alternatively, the input data and/or reference secret data represent biometric acquired by the biometric sensor or the camera of the third device D. For example, the biometric is a fingerprint, face, etc.

At the time of enrolment, the user uses the biometric sensor or camera of the device D which transfers the acquired fingerprint to the first device S for the storing of an associated verifier v in the database of the first device S. This variant is applicable to each of the three previously described embodiments.

In the foregoing, two types of relationships were described between the keys PKpcd and SKpcd of the first device S and keys PKpicc and SKpicc of the second device P.

A first relationship based on multiplication by a scalar g:

PKpicc=SKpicc*g

PKpcd=SKpcd*g

A second relationship based on an exponentiation:

PKpicc=$g^{SKpicc}$

PKpcd=$g^{SKpcd}$

These two alternative relationships are applicable to each of the previously described embodiments.

Additionally, other calculations of PK' can also be envisaged, among which:

PK'=PKpcd$^{1+f(PIN')}$

PK'=PKpcd$^{f2(f(PIN'))}$ where $f_2$ is a predetermined function, preferably one-way, possibly hashing. Evidently the step to generate datum K by device S, in the variant without a masked key, uses a formula adapted to these alternative calculations so that PIN=PIN' if and only if K=K'.

Other calculations of maskedPK can also be envisaged.

Also, rather than triggering acquisition of the input data PIN' in response to receipt by the third device D, these input data can have been previously stored in the memory 20 of the third device D. In this case, the stored PIN' data are read by the processor 18 so as to generate the datum PK'.

Furthermore, as illustrated in the particular case of the sixth embodiment, transmission of the public key PKpicc by the second device P to the first device S is not compulsory. The first device S can in fact generate a plurality of first data (at step 114 or 140 or 156, depending on the embodiment), each first datum being generated by using one of the public keys previously stored in the database of the memory 6. All the first data are then tested at steps 122 (attempted decryption) or 140 (verification of input data) or 156 (signature verification) depending on the embodiment concerned. If the test is successful for one of the first data, this means that the public key PKpicc used as base for generation of this first datum is indeed that of the second device P under consideration; putting of the first device S in secure communication with the second device P is then implemented. If none of the tests are successful, this putting in secure communication is not implemented.

The invention claimed is:

1. Method for putting a first electronic device (S) in secure communication with a second electronic device (P), the method comprising steps of:
generating (114), by the first electronic device (S), at least one first datum (K) dependent on a private key (SKpcd) specific to the first electronic device (S) and dependent on a public key (PKpicc) specific to the second electronic device (P),
generating (116), by the second electronic device (P), at least one second datum (W) dependent on a private key (SKpicc) specific to the second electronic device (P) associated with the public key (PKpicc) specific to the second electronic device (P), and dependent on a third datum (PK'), the third datum (PK') being dependent on a public datum (PKpcd, maskedPK) specific to the first electronic device (S),
implementing a test (118, 120, 122) verifying whether the at least one first datum and the least one second datum (K,K') meet a predetermined condition, and putting the first electronic device (S) in secure communication with the second electronic device (P) only if the predetermined condition is met,
the method comprising the following step implemented before the generating (116) of the at least one second datum (K'):
generating (110) the third datum (PK'), the third datum (PK') taking on a value adapted so that the predetermined condition is met only if at least one input datum (PIN') is identical to at least one reference secret datum (PIN) owned by the second electronic device (P), wherein the at least one input datum (PIN') is acquired by a third electronic device (D) different from the first electronic device and from the second electronic device.

2. The method according to claim 1, wherein said generating (110) the third datum (PK') is performed by the third electronic device (D).

3. The method according to claim 1, wherein said acquiring of the at least one input datum is carried out in response to receipt of the public datum (PKpcd, maskedPK) specific to the first electronic device (S).

4. The method according to claim 2 or claim 3, comprising transmitting (100) to the first electronic device (S) of the public key (PKpicc) specific to the second electronic device (P) via the third electronic device (D).

5. The method according to claim 1, wherein the third datum (PK') is dependent both on the at least one input datum (PIN') and on the at least one reference secret datum (PIN) owned by the second electronic device (P).

6. The method according to claim 1, wherein the third datum (PK') is dependent on:
a verifier (v) of the at least one reference secret datum (PIN), obtained by a calculation comprising applying a function to the at least one reference secret datum (PIN), and
an image of the at least one input datum (PIN') through the function.

7. The method according to claim 1, wherein the third datum (PK') is dependent on a masked key (maskedPK), the masked key being generated by the first electronic device (S) and dependent on:
the at least one reference secret datum (PIN) owned by the second electronic device (P), and
the private key (SKpcd) specific to at least one of the first electronic device (S) and the public key (PKpcd) specific to the first electronic device (S).

8. The method according to claim 1, wherein the third datum (PK') is dependent on the at least one input datum (PIN') but is not dependent on the at least one reference secret datum (PIN) owned by the second electronic device (P), and wherein the first datum (K) is dependent on the at least one reference secret datum (PIN) owned by the second electronic device (P).

9. The method according to claim 8, wherein:
the third datum (PK') is dependent on the image of the at least one input datum (PIN') through application of a function, and
the generation of the first datum generated by the first electronic device (S) uses a verifier (v) of the at least one reference secret datum (PIN) obtained by a calculation comprising an application of the function to the at least one reference secret datum (PIN).

10. The method according to claim 1 wherein:
the first electronic device (S) transmits a challenge to the second electronic device,
the second datum generated by the second electronic device (P) comprises:
a proof datum calculated from the private key (SKpicc) of the second electronic device (P) and from the challenge,
a datum calculated from the third datum (PK'),
the first datum generated by the first electronic device (S) also depends on the challenge datum.

11. The method according to claim 1, wherein the test verifying whether the at least one first datum and the at least one second datum meet a predetermined condition comprises sub-steps of:
transmitting (138) the at least one second datum to the first electronic device (S),
verifying (140), by the first electronic device (S), whether the values of the first datum and second datum are the solution of a predetermined equation, wherein the predetermined condition is met only if verification is positive.

12. A computer program product stored on a non-transitory medium, the product comprising program code instructions to execute the steps of a method for putting a first electronic device (S) in secure communication with a second electronic device (P), when this program is executed by at least one processor, wherein the first electronic device (S) is configured to generate at least one first datum (K) dependent on a public key (PKpicc) specific to the second electronic device (P) and dependent on a private key (SKpcd) specific to the first electronic device (S), the method comprising:
transmitting to the second electronic device (P) a third datum (PK') for the generation by the second electronic device (P) of at least one second datum dependent on the transmitted third datum (PK'), and dependent on a private key (SKpicc) specific to the second electronic device (P) associated with the public key (PKpicc) specific to the second electronic device (P), the third datum (PK') being dependent on a public key (PKpcd, maskedPK) specific to the first electronic device (S), so that a test verifying whether the at least one first datum and the at least one second datum meet a predetermined condition can be implemented, and the first and second electronic devices (S, P) only being put in secure communication if the condition is met,
the computer program product being characterized in that the method further comprises a step of:
generating the third datum (PK'), the third datum (PK') taking on a value adapted so that the predetermined condition is met only if the at least one input datum (PIN') are identical to at least one reference secret datum (PIN) owned by the second electronic device (P), wherein the at least one input datum (PIN') is acquired by a third electronic device (D) different from the first electronic device and from the second electronic device.

13. A computer program product stored on a non-transitory medium, the product comprising program code instructions for execution of the steps of a method for putting a first electronic device (S) in secure communication with a second electronic device (P), when this program is executed by at least one processor, the method comprising steps of:
generating at least one first datum (K) dependent on a private key specific to the first electronic device (S) and dependent on a received public key (PKpicc),
transmitting a public key (PKpcd) specific to the first electronic device (S), associated with the private key specific to the first electronic device (S), for the generation by the second electronic device (P) of at least one second datum (K) which is dependent on:
a private key (SKpicc) specific to the second electronic device (P), associated with the public key (PKpicc) specific to the second electronic device (P), and
a third datum (PK'), the third datum (PK') being dependent on the transmitted public key (PKpcd),
participating in a test verifying whether that the at least one first datum and the at least one second datum meet a predetermined condition, and putting in secure communication with the second electronic device only if the predetermined condition is met,
wherein the at least one first datum (K) has a value adapted so that the predetermined condition is met only if at least one reference secret datum (PIN) owned by the second electronic device (P) are identical to at least one input datum (PIN'), wherein the at least one input datum (PIN') is acquired by a third electronic device (D) different from the first electronic device and from the second electronic device.

14. A computer program product stored on a non-transitory medium, the product comprising program code instructions to execute the steps of a method for putting a first electronic device (S) in secure communication with a second electronic device (P) when this program is executed by at least one processor, the method comprising steps of:
generating at least one first datum (K) dependent on a private key (SKpcd) specific to the first electronic device (S), and from a public key (PKpicc) specific to the second electronic device (P),
generating a masked key (maskedPK), the masked key (maskedPK) being dependent on the private key (SKpcd) specific to the first electronic device (S) and/or on a public key (PKpcd) specific to the first electronic device (S) associated with the private key (PKpcd) specific to the first electronic device (S),
transmitting the masked key (maskedPK), for the generation by the second electronic device (P) of at least one second datum (K) dependent on:
a private key (SKpicc) specific to the second electronic device (P) associated with the public key (PKpicc) specific to the second electronic device (P), and
a third datum (PK'), the third datum (PK') being dependent on the transmitted masked key (maskedPK),
participating in a test verifying whether the at least one first datum and the at least one second datum meet a predetermined condition, and putting in secure communication with the second electronic device (P) only if the predetermined condition is met,
wherein the masked key (maskedPK) has a value wherein the predetermined condition is met only if the at least one reference secret datum (PIN) owned by the second electronic device (P) are identical to at least one input datum (PIN'), wherein the at least one input datum (PIN') is acquired by a third electronic device (D) different from the first electronic device and from the second electronic device.

* * * * *